(12) United States Patent
Wee et al.

(10) Patent No.: US 7,624,652 B2
(45) Date of Patent: Dec. 1, 2009

(54) METHOD AND APPARATUS FOR TOMOGRAPHIC MULTIPHASE FLOW MEASUREMENTS

(75) Inventors: Arnstein Wee, Randaberg (NO); Ingve Morten Skjaeldal, Hafrsfjord (NO)

(73) Assignee: Multi Phase Meters AS, Forus (NO)

( * ) Notice: Subject to any disclaimer, the term of this patent is extended or adjusted under 35 U.S.C. 154(b) by 0 days.

(21) Appl. No.: 12/298,654

(22) PCT Filed: Dec. 18, 2006

(86) PCT No.: PCT/NO2006/000486

§ 371 (c)(1),
(2), (4) Date: Jan. 22, 2009

(87) PCT Pub. No.: WO2007/129897

PCT Pub. Date: Nov. 15, 2007

(65) Prior Publication Data

US 2009/0126502 A1    May 21, 2009

(30) Foreign Application Priority Data

May 5, 2006   (NO) .................................. 20062028

(51) Int. Cl.
*G01F 1/44* (2006.01)
(52) U.S. Cl. .................................................. 73/861.63
(58) Field of Classification Search ........ 73/861.62–65, 73/61.41, 861.04
See application file for complete search history.

(56) References Cited

U.S. PATENT DOCUMENTS

| 4,201,083 A | 5/1980 | Kurita et al. |
| 4,402,230 A | 9/1983 | Raptis |
| 4,423,623 A | 1/1984 | Ho et al. |
| 4,459,958 A | 7/1984 | Latapie |
| 4,604,902 A | 8/1986 | Sabin et al. |

(Continued)

FOREIGN PATENT DOCUMENTS

GB     2 210 461 A    6/1989

(Continued)

OTHER PUBLICATIONS

Search Report issued by Norwegian Patent Office for priority Norwegian application 2006 2028.

*Primary Examiner*—Jewel Thompson
(74) *Attorney, Agent, or Firm*—Frommer Lawrence & Haug LLP; Ronald R. Santucci

(57) ABSTRACT

A method for determining the flow rates of a fluid comprising a multi-component mixture of a gas and at least one liquid in a pipe, the method comprising the following steps: a) the multi-component mixture flow is conditioned to create a symmetrical annular gas concentration flow condition, b) the density distribution and/or dielectric constant distribution in said symmetrical flow within a cross-section of the pipe is determined, c) a function describing the radial distribution of density and/or radial distribution of dielectric constant is determined, d) the velocity of the multi-component mixture is determined, e) the temperature and pressure are obtained, and, f) based on the knowledge of densities and/or dielectric constants of the components of the fluid mixture, and the result from the above steps a-e, the volume and/or mass flow rates of the gas and liquid components of the fluid mixture are calculated. An apparatus for performing the method is also disclosed.

30 Claims, 8 Drawing Sheets

U.S. PATENT DOCUMENTS

Figure 1:
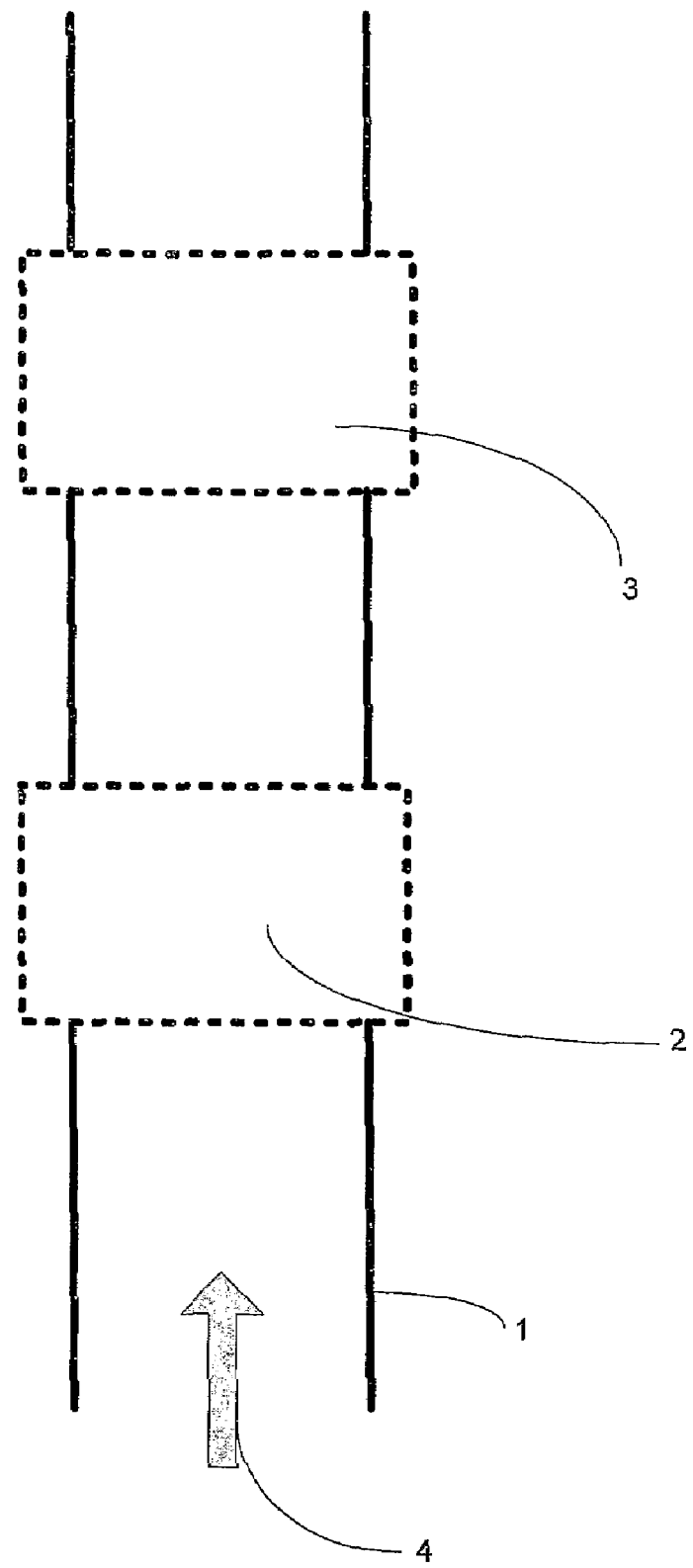

| | | |
|---|---|---|
| 4,638,672 A | 1/1987 | McCall |
| 4,974,452 A | 12/1990 | Hunt et al. |
| 4,976,154 A | 12/1990 | Schneider et al. |
| 5,103,181 A | 4/1992 | Gaisford et al. |
| 5,130,661 A | 7/1992 | Beck et al. |
| 5,135,684 A | 8/1992 | Mohn et al. |
| 5,331,284 A | 7/1994 | Jean et al. |
| 5,351,521 A | 10/1994 | Cracknell |
| 5,383,353 A * | 1/1995 | Marrelli et al. ............ 73/61.43 |
| 5,455,516 A | 10/1995 | Jean et al. |
| 5,485,743 A | 1/1996 | Taherian et al. |
| 5,701,083 A | 12/1997 | Goldberg et al. |
| 5,793,216 A | 8/1998 | Constant |
| 5,869,771 A * | 2/1999 | Rajan et al. ............... 73/861.04 |
| 6,009,760 A | 1/2000 | Jakkula et al. |
| RE36,597 E | 3/2000 | Agar et al. |
| 6,097,786 A | 8/2000 | Groves et al. |
| 6,109,097 A | 8/2000 | Conrads et al. |
| 6,272,934 B1 | 8/2001 | Rajan et al. |
| 6,332,111 B1 | 12/2001 | Fincke |
| 6,335,959 B1 | 1/2002 | Lynch et al. |
| 6,378,380 B1 | 4/2002 | Kusters et al. |
| 6,612,187 B1 * | 9/2003 | Lund ....................... 73/861.04 |
| 6,614,238 B1 | 9/2003 | Jean et al. |
| 6,755,086 B2 | 6/2004 | Salamitou et al. |
| 6,857,323 B1 | 2/2005 | Shajii et al. |
| 6,898,986 B2 | 5/2005 | Daniel et al. |
| 6,940,286 B2 | 9/2005 | Wang et al. |
| 6,993,979 B2 | 2/2006 | Segeral |

FOREIGN PATENT DOCUMENTS

| | | |
|---|---|---|
| WO | WO 90/02940 A | 3/1990 |
| WO | WO 90/02941 A | 3/1990 |
| WO | WO 94/17373 A | 8/1994 |
| WO | WO 00/45133 A | 8/2000 |
| WO | WO 03/034051 A | 4/2003 |
| WO | WO 2005/057142 A | 6/2005 |
| WO | WO 2005/067142 A | 7/2005 |

* cited by examiner

5/10

METHOD AND APPARATUS FOR TOMOGRAPHIC MULTIPHASE FLOW MEASUREMENTS

This application is a 371 of PCT/NO2006/000486 filed on Dec. 18, 2006, published on Nov. 15, 2007 under publication number WO 2007/129897 A which claims priority benefits from Norwegian Patent Application No. 2006 2028 filed May 5, 2006, the disclosure of which is hereby incorporated by reference.

The present invention relates to a method and flow meter for determining the composition and flow rates of individual components of a multiphase fluid, as defined in the preambles of claims 1 and 18, respectively.

The problem of how to meter oil-water-gas mixtures has been of interest to the petroleum industry since the early 1980s. Since then considerable research has been conducted into the development of a three-phase flow meter suitable for use in an industrial environment.

There are several techniques and known instruments for measuring multiphase flow, as will be further described below. Such instruments need to be reasonably accurate (typically better than ±5% of rate for each phase), non-intrusive, reliable, flow regime independent and provide accurate measurements over the full component fraction range. In spite of the large number of solutions that have been proposed in recent years, no commercially available three phase flow meter yet meets all these requirements. In addition to stringent measurement requirements, the instrument needs to perform reliable in a harsh and corrosive environment such as several thousand meters below the sea surface. Inside the pipe, the flowing multiphase fluid may be traveling at a speed of 1-50 m/s with pressures in excess of 1000 bars and temperatures above 200° C. Sand is often also present and can damage the interior of the instrument.

Multiphase flow in the oil & gas industry is commonly defined as a mixture of liquids and gas where the amount of free gas, also denoted GVF, is less than 90% of the volume of the pipe. For GVFs in the range 90%-99.99%, the multiphase flow is often referred to as a wet gas. In many cases the producing wells are defined as multiphase wells in the early production stage and may develop into wetgas wells as the oil is drained from the reservoir and more of the gas cap is produced. For clarification purposes, multiphase flow in the context of this patent application covers the full component fraction range and hence includes both wetgas and multiphase flow conditions.

The output of an oil/gas reservoir may vary greatly, depending on the location and age of the well. In addition to the oil and gas components, water, sand and wax may also be present in the produced well stream. Since the location and output of a well may vary so widely, the systems that have been designed to collect and process this output also vary considerably. The initial target of the oil industry to develop a universal multiphase flow meter to replace the traditional separation/single phase metering solution currently used, the fiscal monitoring of a well's output, have yet to be realised.

Multiphase flow meters are increasingly used for well testing and allocation measurement.

In order to optimise the production and life of an oil/gas field, operators need to be able to regularly monitor the output of each well in the field. The conventional way of doing this is to use a test separator. Test separators are expensive, occupy valuable space on a production platform, and require a long time to monitor each well because of the stabilised flow conditions required. In addition, test separators are only moderately accurate (typically ±5 to 10% of each phase flow rate) and cannot be used for continuous well monitoring. A three-phase flow meter could be used in the first instance instead of a test separator and in the long term as a permanent installation on each well. Such an arrangement would save the loss in production normally associated with well testing. Such loss is estimated to be approximately 2% for a typical offshore installation. Allocation metering is needed when a common pipeline is used to transport the output from a number of wells owned by different companies to a processing facility. This is currently achieved by passing the output of each well through a test separator before entering the common pipeline. However, in addition to the disadvantages of the test separator described above, dedicated test pipelines to each well are also required. A permanently installed three-phase flow meter would offer significant advantages for allocation metering.

According to a group of major oil companies, the accuracy requirements for a multiphase meter within a gas volume fraction range of 0-99% and water cut range of 0-90%, is 5-10% relative error on the liquid and gas flow rate and water cut measurement error within 2% abs. More accurate measurements were required for production allocation applications. Commercial three-phase flow meters are now generally capable of measuring individual phase fraction's flow rate to an uncertainty of less than 10% over a reasonably wide range of flow rates and phase fractions. There are two areas of operation which need further investigation if flow rate uncertainty is to be reduced still further using current combinational measurement techniques: flow regime dependency and individual phase velocity measurement.

Some examples of commercially available non-intrusive multiphase meters, such as those known from NO 304333, NO 304332, U.S. Pat. No. 5,103,181, WO 00/45133 (FIG. 5) and U.S. Pat. No. 6,097,786, measure the cross sectional composition and velocity of the phases to obtain flow rates. In order to provide accurate measurements, a homogeneous mixture in the cross section of the pipe is required. Effects due to inhomogenity in the longitudinal direction of the pipe is normally minimised by fast sampling of the cross-sectional composition. Multiphase meters are normally not mounted in a horizontal position due to the presence of laminar flow, where water is in the bottom of the pipe and gas at the top, which would distort the measurement. Consequently, to achieve homogeneous mixture in the cross section of the pipe of a multiphase meter, it is common practice to install the multiphase meters in such a way that the flow is flowing in an upward or downward direction. Laminar flow may then be avoided. However, when a multiphase mixture containing gas and liquid(s) are flowing in a vertical direction, annular gas concentration often occurs. Annular gas concentration means that there is a higher percentage of gas (GVF) in the center of the pipe compared to the GVF at the pipe wall. The gas concentration may be symmetrical or unsymmetrical depending on the particular installation. Symmetrical means that the GVF is constant along the circumference of any circle with its origin in the center of the pipe and a radius in between the center of the pipe and the pipe wall. Annular gas concentration flow distorts the measurement in a similar manner as laminar flow in a horizontal installation. In horizontal pipes pure annular flow where all the gas is in the middle of the pipe would normally only occur at higher gas fractions. However, when the flow is flowing in vertical pipes, severe concentration of gas in the middle of the pipe has been experienced even at medium flow rates (a few m/s) and gas fractions as low as 10%. Even a concentration of the gas in the middle of the pipe at lower gas fractions would introduce severe measurement errors. In practice, the liquid is rarely completely free of gas.

NO 304333, U.S. Pat. No. 5,103,181, U.S. Pat. No. 6,097,786 and U.S. Pat. No. 5,135,684 uses a nuclear densitometer. When a nuclear densitometer is used to measure the density, it is not possible to obtain full coverage of the cross section of the pipe. Hence, in order to obtain accurate measurements, it relies on a homogeneous mixture in the cross section. Typical commercial available nuclear detectors for density measurement, based on the Caesium 662 keV peak, has a circular area with a radius of 2" and lower. For dual energy systems (x-ray and γ-ray) as described in U.S. Pat. No. 5,135,684 and U.S. Pat. No. 6,097,786, the area is normally even smaller due to the need for a composite window in the pipe in order to allow radiation from the low energy x-ray radiation to go through the pipe. The cover area in a 2" pipe with a typical commercially available γ-ray densitometer is typically 70-80% of the total cross sectional area of the pipe. However, when used in a 6" pipe, it is difficult to achieve more than 30% coverage of the cross section of the pipe. One way to increase the coverage is to place the density measurement inside a venturi passage as in U.S. Pat. No. 5,135,684. However, placing the nuclear density measurement inside a venturi passage also increases the amount of annular flow in the measurement section. When the source and detector is placed in the middle of the pipe, a too low density will be measured at annular flow. The error in the measurement will increase as the area of the pipe is increased. One way to compensate for this effect is to place the densitometer off-centre. However, the measurement errors due to annular gas concentration in the middle of the pipe would still be significant.

Yet another way to minimise the effect of annular flow is to use a mixing device. U.S. Pat. No. Re. 36,597 describes a method where a positive displacement meter is used to both measure the total flow rate and homogenise the multiphase mixture in advance of the composition measurement. Annular flow is then minimised; however, the multiphase meter becomes highly intrusive and fragile since it depends on a mechanical restricting or rotating device located in the multiphase stream. The repeatability of the measurement over time would also be vulnerable to sand erosion. Another way to reduce the presence of annular flow is to use a mixer. U.S. Pat. No. 5,135,684 refer to a method where a hold up-tank is used to homogenise the multiphase flow. However, the structure is highly intrusive, thus creating a pressure drop and hence limiting the production capabilities from the wells. The performance of the mixer would also be dependent on the flow rate and pattern such as length of gas and liquid slugs and could therefore limit the operational envelope of such a multiphase meter. Another method based on mixing of the multiphase flow is described in U.S. Pat. No. 6,272,934.

Yet another way to reduce the effect of annular flow is to perform the composition measurement at the cross section of an annular venturi is shown in WO00/45133, FIG. 1. However, this method is also intrusive and the repeatability of the measurement over time would also be vulnerable to sand erosion.

It is also well known that the composition of the multiphase mixture can be measured based on a measurement of the cut-off frequency of the pipe. Examples of such devices are found in U.S. Pat. No. 4,423,623, U.S. Pat. No. 5,455,516, U.S. Pat. No. 5,331,284, U.S. Pat. No. 6,614,238, U.S. Pat. No. 6,109,097 and U.S. Pat. No. 5,351,521 describing methods for determining the composition of a multiphase mixture based on a measurement of the cut-off frequency of a pipe based on loss or phase measurements at a varying frequency. However, all these methods are greatly influenced by annular gas concentration and would not provide the required measurement accuracy under such conditions.

Tomographic techniques for measurements of multiphase flow are also well known. Examples of such devices are found in U.S. Pat. No. 5,48,5743, U.S. Pat. No. 5,130,661, U.S. Pat. No. 6,857,323, U.S. Pat. No. 6,940,286 and U.S. Pat. No. 5,793,216. However all these tomographic techniques require complex sensors and sophisticated measurement algorithms for deriving the composition and flow rates of the multiphase fluid and are therefore difficult to realize in an harsh industrial environment such as pipes with oil, gas and water. The sensors are normally located around the entire circumference of the pipe for the purpose of obtaining a detailed image of the multiphase distribution within the pipe. The complexity and rapid changes of multiphase flow combined with the complexity of the measurement algorithms involved in a full-blown tomographic system may also easily introduce instability in the calculation routines resulting in large errors in the final calculations. It is also time consuming to develop models for such a system making them difficult to scale for different pipe diameters. Furthermore, such systems are also time consuming to configure and calibrate and not well suited for industrial production.

WO 2005/067142 describes a multiphase flow meter based on a simplified tomographic technique for determination of the composition and flow rates. The method relies on annular gas concentration in a sensor element installed in a vertical upward flow direction. Based on measurements performed in multiple directions of the pipe, the degree of annular gas concentration is determined and used in order to determine fractions and flow rates of the components of the multiphase fluid. However, the method relies on symmetrical annular gas concentration in the pipe which can not be guaranteed without a conditioning device upstream the multiphase flow meter.

Devices for measuring the flow rates of a multiphase fluid are well known. Such devices may be based on cross correlation of a measurement signal detecting variations in liquid and gas droplets of the flow. By transmitting a carrier signal into the flow and measuring the response, the received signal contain information of the variations in the flow caused by amplitude (loss), phase or frequency modulation by the disturbances. By performing the measurements at two sections of the pipe located at a known distance from each other, one can create two time varying signals that are shifted in time equal to the time it takes the multiphase flow to travel between the two sections. Example of such devices based on an electromagnetic carrier signal are disclosed in U.S. Pat. No. 4,402,230, U.S. Pat. No. 4,459,958, U.S. Pat. No. 4,201,083, U.S. Pat. No. 4,976,154, WO94/17373, U.S. Pat. No. 6,009,760 and U.S. Pat. No. 5,701,083

Other devises for measurement of flow rates may be based on measurement of differential pressures across a restriction in the pipe such as a venturi, orifice, v-cone or flow mixer. Examples of such devices can be found in U.S. Pat. No. 4,638,672, U.S. Pat. No. 4,974,452, U.S. Pat. No. 6,332,111, U.S. Pat. No. 6,335,959, U.S. Pat. No. 6,378,380, U.S. Pat. No. 6,755,086, U.S. Pat. No. 6,898,986, U.S. Pat. No. 6,993,979, U.S. Pat. No. 5,135,684, WO 00/45133 and WO03/034051. However, none of the devices above are suited for accurate measurements of the flow rates with annular gas concentration in the pipe.

It is the purpose of this invention to overcome the above mentioned limitations of existing solutions.

It is the purpose of the invention to provide accurate measurements of the oil, water and gas flow rates of a multiphase mixture in any flow regime.

It is the purpose of the invention to condition a flowing multiphase mixture such that a swirl free symmetrical annular gas concentration flow regime is obtained in a tomographic measurement device.

It is the purpose of the invention to condition a multiphase mixture such that simplified tomographic techniques can be used to measure the oil, water and gas flow rates of a multiphase mixture in any flow regime.

It is the purpose of this invention to obtain a tomographic measurement of a flowing multiphase mixture based on simple parameterization models.

It is the purpose of this invention to allow the use of simple and accurate mathematical modeling of a multiphase flow.

It is the purpose of this invention to provide a compact structure for flow conditioning and measurements.

It is the purpose of this invention to allow the use of simple calibration routines for a multiphase flow meter.

It is the purpose of this invention to allow the use of simple verification routines for a multiphase flow meter.

It is the purpose of this invention to provide a multiphase flow meter with high measurement accuracy over the full component range of the individual fractions of a multiphase fluid.

It is the purpose of this invention to provide accurate measurement of the liquid fraction at wetgas flow conditions.

It is the purpose of this invention to provide little pressure drop in the pipe of the flowing multiphase fluid.

It is the purpose of this invention to provide a non-intrusive device for performing multiphase flow measurements.

It is the purpose of this invention to allow compact installation of a multiphase flow meter.

It is the purpose of the invention to provide a compact mechanical structure for performing the measurements.

The method according to the present invention compromises the following steps:

a. the multi-component mixture flow is conditioned to create a symmetrical annular gas concentration flow condition, b. the density distribution and/or dielectric constant distribution in said symmetrical flow within a cross-section of the pipe is determined, c. a function describing the radial distribution of density and/or radial distribution of dielectric constant is determined, d. the velocity of the multi-component mixture is determined, e. the temperature and pressure are obtained, and, f. based on the knowledge of densities and/or dielectric constants of the components of the fluid mixture, and the result from the above steps a-e, the volume and/or mass flow rates of the gas and liquid components of the fluid mixture are calculated.

The apparatus according to the invention is further characterized by the features as defined in the independent claim 18.

Dependent claims 2-17 and 19-30 define preferred embodiments of the invention.

Figure 2:
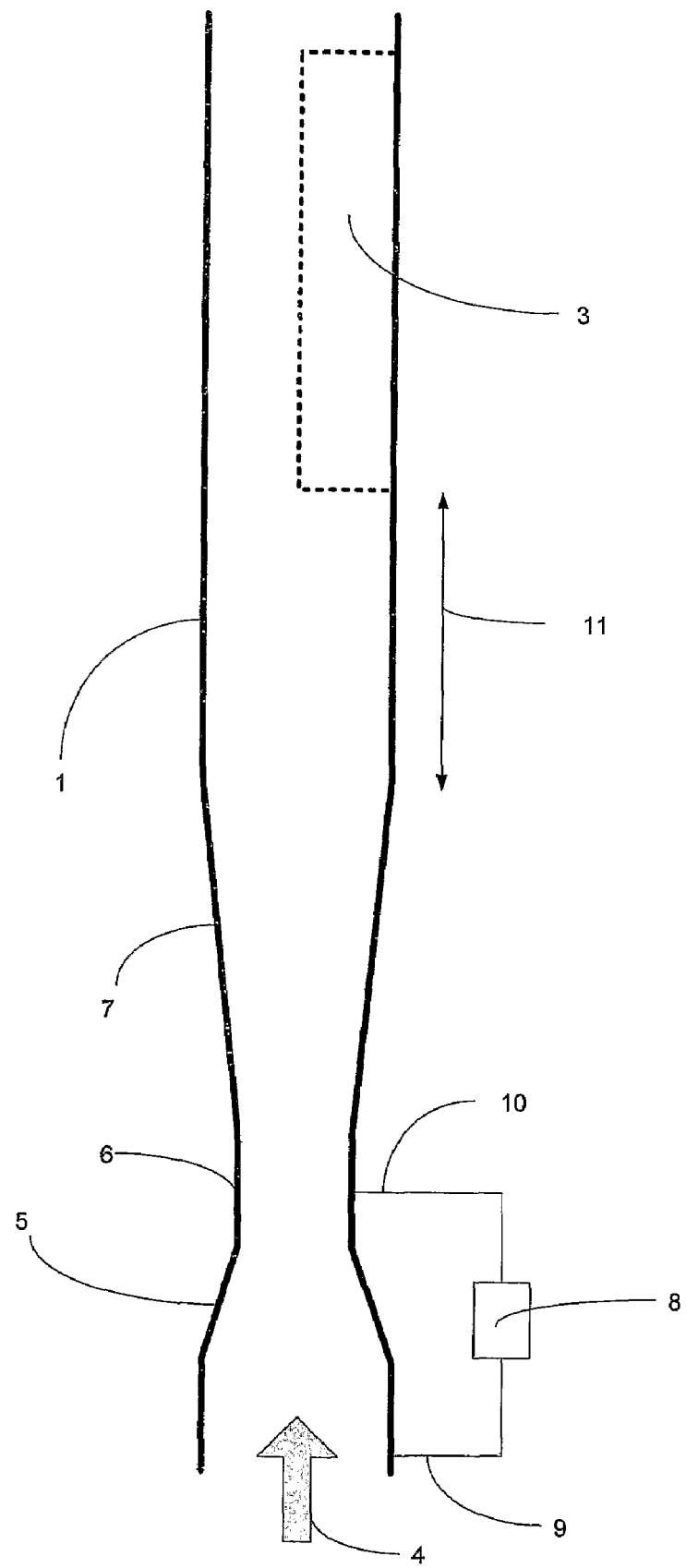
Figure 3:
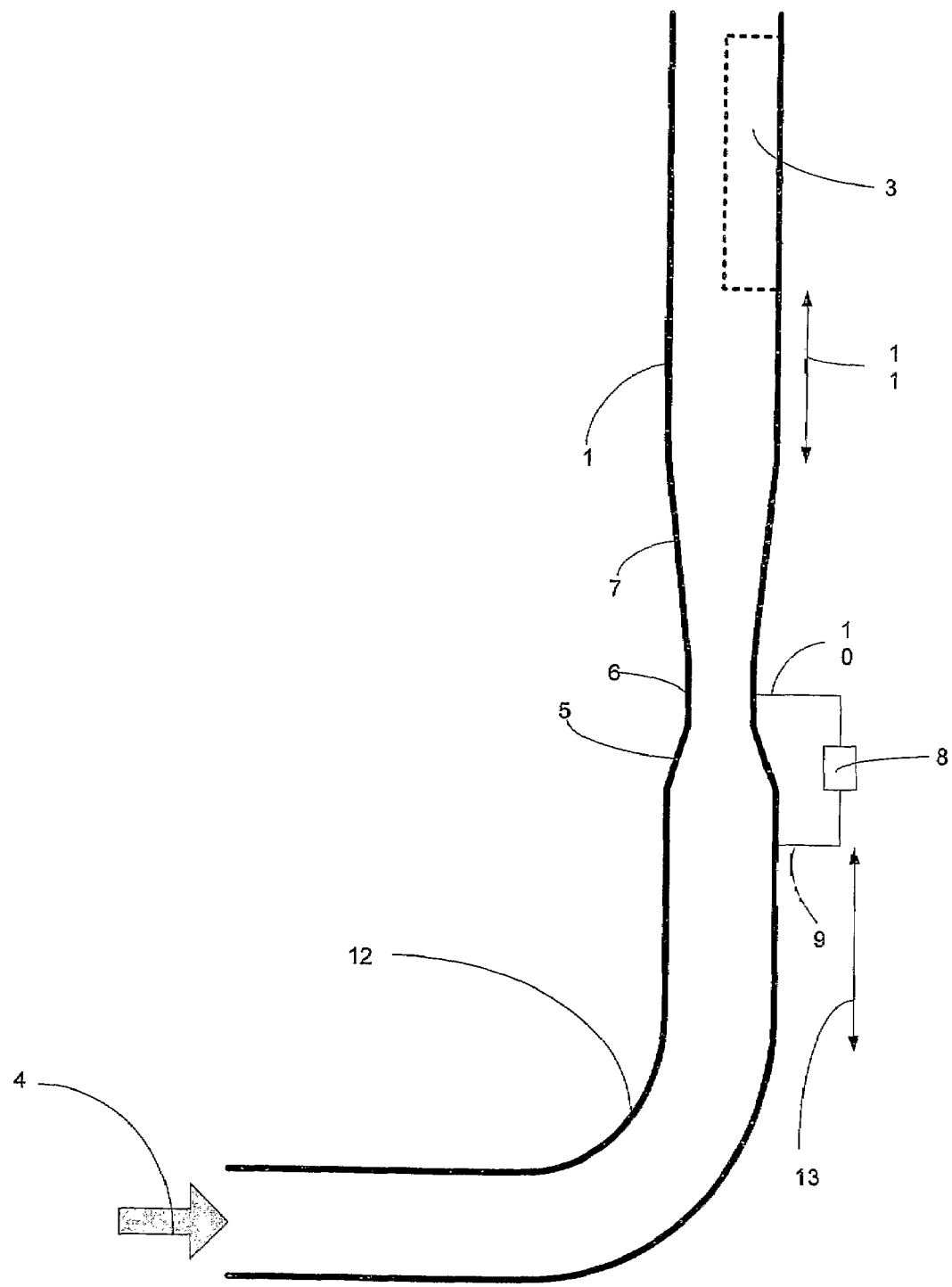
Figure 4:
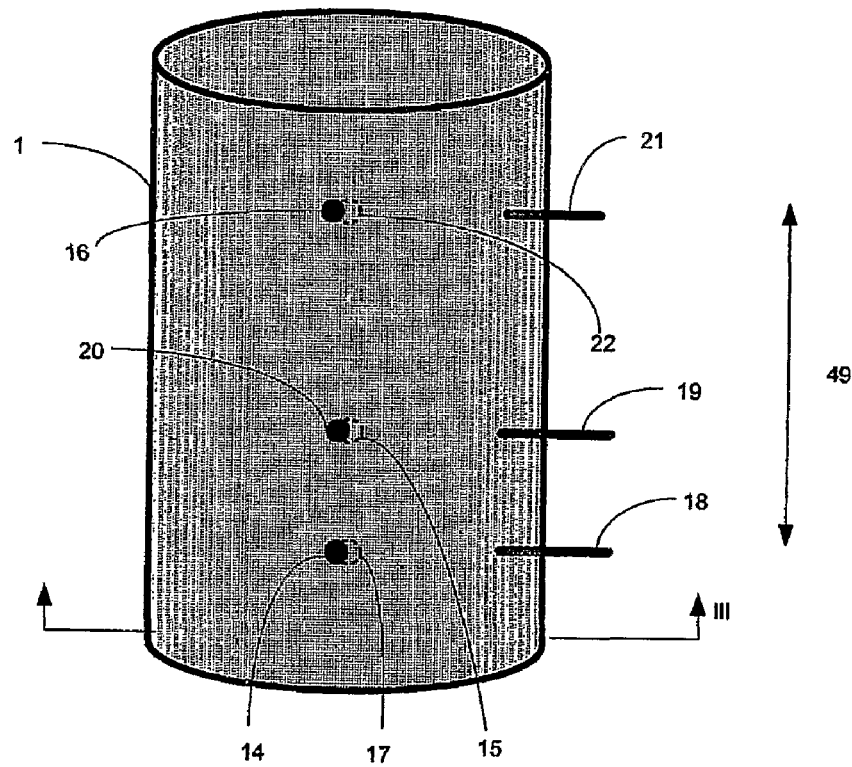
Figure 5:
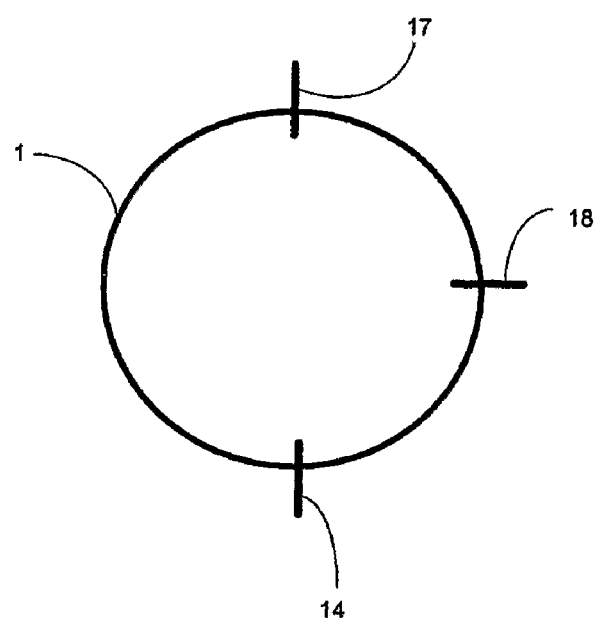
Figure 6:
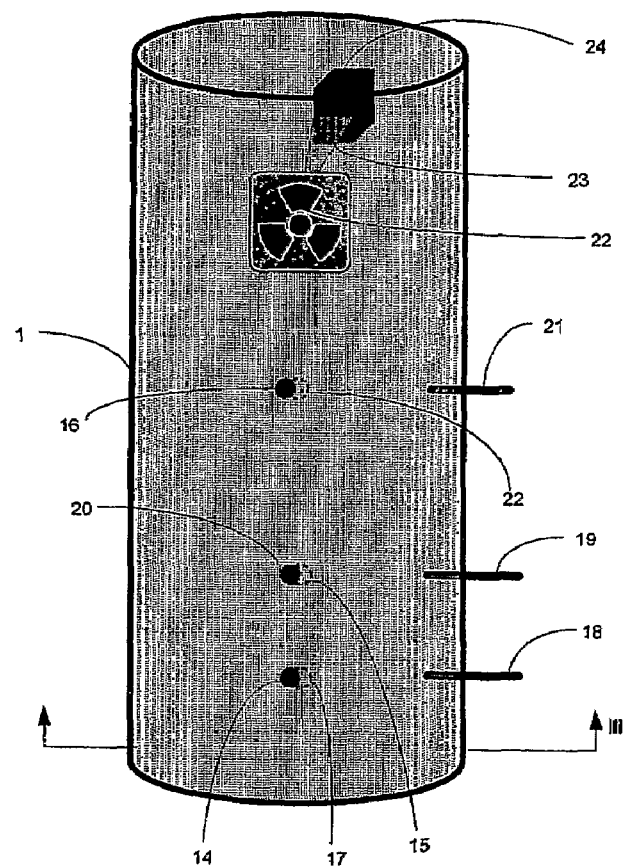
Figure 7:
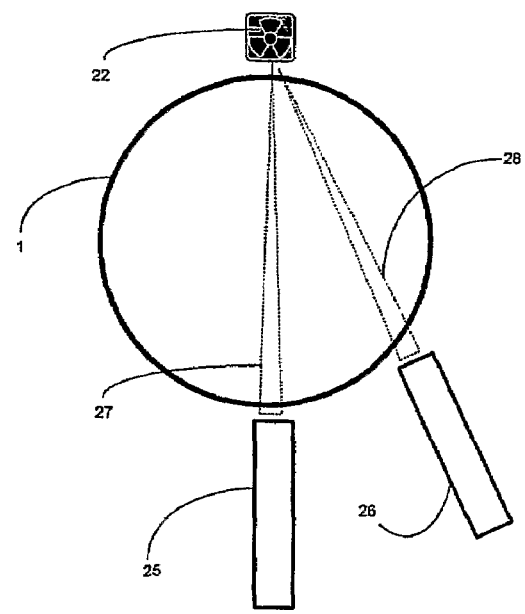
Figure 8:
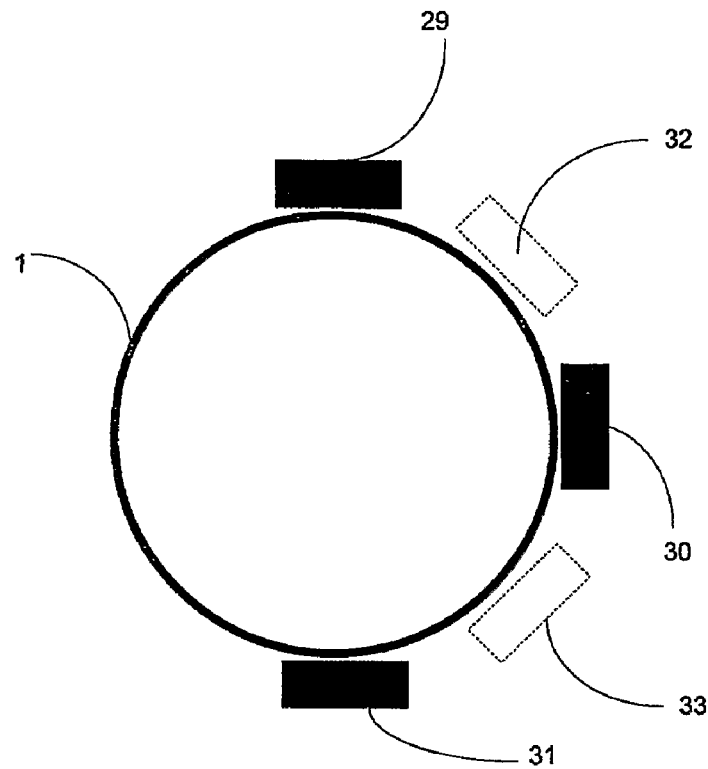
Figure 9:
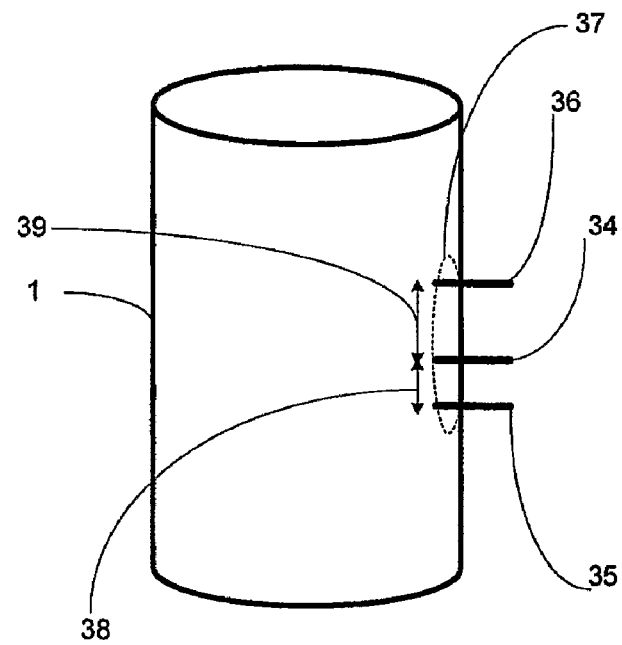
Figure 10:
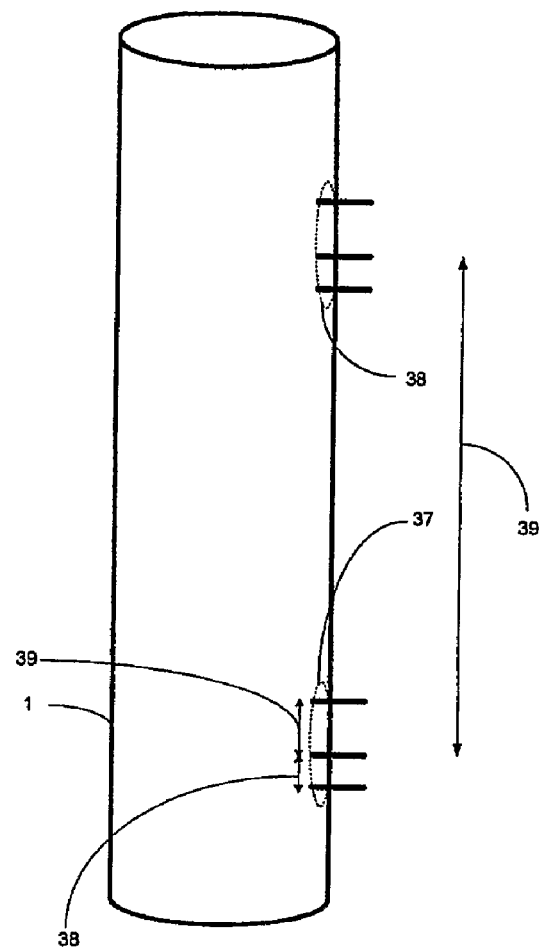
Figure 11:
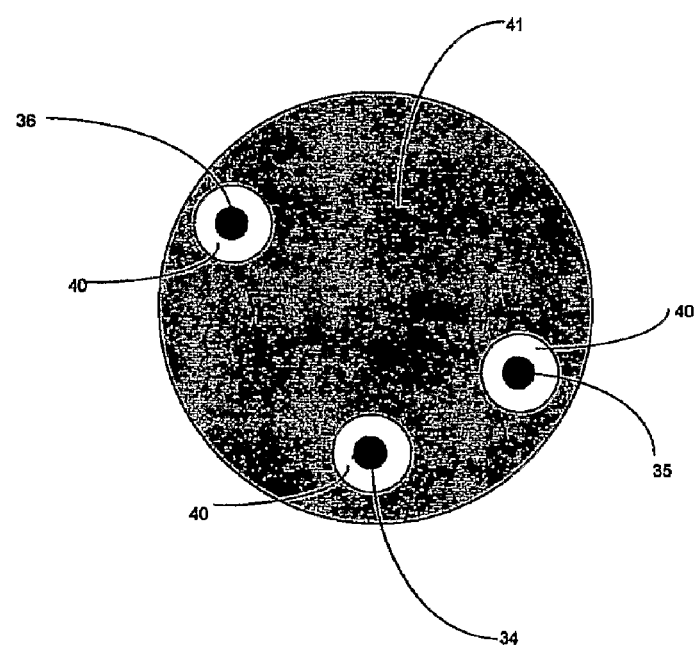
Figure 12:
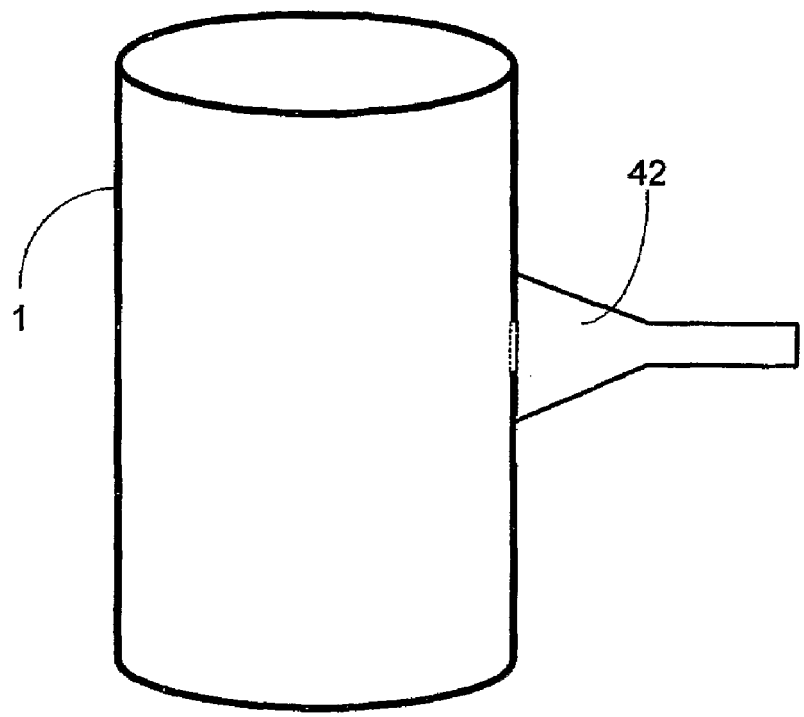
Figure 13:
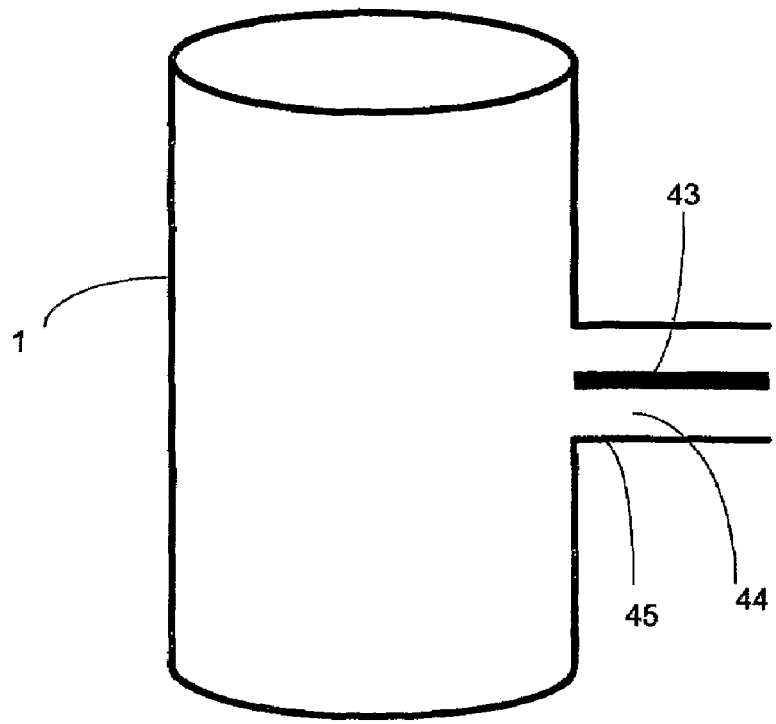

The invention will be further described in the following with reference to the figures, where:

FIG. 1 shows a schematic longitudinal sectional view of the main elements of the invention, FIG. 2 shows a schematic longitudinal sectional view of an exemplifying embodiment of an apparatus for measuring the oil, water and gas fractions and flow rates according to the invention, FIG. 3 shows a schematic longitudinal sectional view of an exemplifying embodiment of an apparatus for measuring the oil, water and gas fractions and flow rates according to the invention, FIG. 4 shows a schematic longitudinal sectional view of an exemplifying embodiment of an apparatus for performing tomographic measurements according to the invention, FIG. 5 shows a schematic cross sectional view along the line III-III in FIG. 4, FIG. 6 shows a schematic longitudinal sectional view of an exemplifying embodiment of an apparatus for performing tomographic measurements according to the invention, FIG. 7 shows a schematic longitudinal sectional view of an exemplifying embodiment of an apparatus for performing tomographic measurements according to the invention, FIG. 8 shows a schematic longitudinal sectional view of an exemplifying embodiment of an apparatus for performing tomographic measurements according to the invention, FIG. 9 shows a schematic longitudinal sectional view of an exemplifying embodiment of an apparatus for performing tomographic measurements according to the invention, FIG. 10 shows a schematic longitudinal sectional view of an exemplifying embodiment of an apparatus for performing tomographic measurements according to the invention, FIG. 11 shows a schematic view of a compact mechanical unit of antennas (probe assembly), FIG. 12 shows a schematic longitudinal sectional view of an exemplifying embodiment of an apparatus for performing tomographic measurements according to the invention, FIG. 13 shows a schematic longitudinal sectional view of an exemplifying embodiment of an apparatus for performing tomographic measurements according to the invention, The present invention relates to a method and apparatus for measuring the flow rates and volume fraction of a multiphase mixture in a pipe. The invention contains tree elements. A vertical tubular section 1, a flow conditioning device 2, which also may be a combined conditioning device and measurement device, and a measurement device 3. The purpose of the flow conditioner is to condition the multiphase fluid such that the gas and liquid(s) are distributed symmetrically along the radius of the pipe. Moreover, the purpose of the flow conditioner is to create a flow regime, which for the purpose of this patent application, is defined as a swirl free symmetrical annular gas concentration which for simplicity here after referred to as symmetrical annular gas concentration or just SAGC. Element 3, located downstream the flow condition device 2, is a device suitable for measuring the gas and liquid(s) component fractions in a symmetrical annular gas concentration flow regime.

Symmetrical annular gas concentration means that there is a higher percentage of gas (GVF) in the center of the pipe compared to the GVF at the pipe wall, and furthermore the GVF is constant along the circumference of any circle with its origin in the center of the pipe and a radius in between the center of the pipe and the pipe wall. The rate of change in the GVF from the center of the pipe towards the pipe all may be linear or non-linear. For non-linear decrease of the GVF, the change may be S-shaped, such as a tanh function, or a step function implying that the liquid is almost completely separated from the gas. The latter case is normally referred to as (pure) annular flow commonly occurring at high gas fractions such as wetgas flow. The function describing the change in the GVF from the center of the pipe towards the pipe wall is, for the purpose of this patent application, referred to as the concentration profile function.

The flow conditioner utilizes the swirl of the multiphase flow to generate a symmetrical annular gas concentration flow. Swirl means that the multiphase flow has an axial rotation component as it travels down the pipe. By directing the multiphase flow into a more narrow passage in the pipe, the rotation speed of the swirl increases and a SAGC flow regime is generated. By gradually decreasing the axial rotation speed by a gradual increase of the pipe diameter, the rotation speed of the swirl can be reduced while maintaining a SAGC flow regime. A venturi can be used as the flow conditioning device 2 which also can be a combined flow conditioning and measurement device.

Swirl is a normal occurrence for a multiphase flow in pipelines containing bends and straight sections. The bends redirects the flow direction introducing a rotational force to the flow. However, if the flow line is straight for a long section, the swirl will diminish. Under such conditions, a pipe structure containing one or two bends can be used upstream the flow conditioner in order to generate the required swirl in the multiphase flow. Alternatively, fins inside the pipe can be used to generate swirl in the flow.

For a SAGC flow regime, simplified process tomographic measurement techniques are ideally suited for performing accurate measurements of the composition and flow rate of the multiphase fluid. The basic concept of process tomography is to use a number of sensors around the circumference of the pipe. The signals from the sensors are then processed to provide an image of the multiphase flow in the cross-section of the pipe. Since the liquid/gas distribution is symmetrical in the cross-section of the pipe, simple tomographic parameterization models and calculation routines for determining the liquid/gas distribution in the cross-section of the pipe can be used. In addition, the symmetry allows for use of a simpler sensor arrangement compared to conventional tomographic sensors since it is sufficient to perform measurement just one half-section of the pipe cross-section. The present invention also provides for simpler calibration of the models and sensors. For pure annular flow where all the liquid is distributed as a film along the wall, the composition measurement of the multiphase flow simplifies to become a measurement of the thickness of the liquid film along the wall. Pure annular flow is a common occurrence at high GVFs, and consequently the present invention allows for very accurate measurement of the liquid fraction under such conditions.

Below is a summary of the invention.

A flow conditioning device 2 is located downstream a device for performing tomographic measurements 3 in a vertical tubular section 1 as shown in FIG. 1. The direction of the flow is shown with an arrow 4. Tomographic measurements means that the distribution of the fractions of the multiphase mixture in the cross section of the pipe is measured with sensor(s) located around the circumference of the pipe, as shown in FIG. 1, or in just one half section of the vertical tubular section as shown by the stipulated area 3 of FIG. 2. The purpose of the flow conditioning device 2 is to generate a swirl free symmetrical annular gas concentration flow regime such that it is sufficient to measure the individual fractions and distribution of the individual fractions of the multiphase mixture in just one half section of the pipe 3 in order to calculate the individual fractions and the distribution of the fractions of the multiphase mixture for the entire tubular section 1. The tomographic sensor arrangement 3, as shown in FIG. 2, is also referred to as simplified tomographic measurement since symmetry in the flow allows for measurement in just one half cross section of the pipe to determine the distribution within the whole pipe cross section. Tests in the MPM MultiPhase Flow Labatory have revealed that a venturi, as shown in FIG. 3, can be used as a combined flow conditioning device 2 and measurement device. A venturi consists of a convergent section 5 into a narrow passage 6 in a pipe 1. By measuring the upstream pressure 9 and the pressure in the narrow passage 10 by means of a pressure transmitter 8, the flow rate of the fluid(s) can be determined. The rotation speed of any swirl in the multiphase mixture at the inlet of the venturi, will be accelerated in the convergent section 5 generating a symmetrical annular gas concentration flow regime in the narrow passage 6 with a high rotation speed (swirl). The rotation speed of the swirl is then retarded in the divergent section 7 as the diameter expands back to its original size. In the stabilization section 11, the rotation speed of the swirl will further reduce and stabilize while maintaining a symmetrical annular gas concentration flow regime. Typical length of the stabilization zone is 2-3 pipe diameters. Then, a symmetrical annular gas concentration regime will be maintained for the entire tomographic measurement section 3 without any swirl or with a very low rotation speed such that the multiphase fluid for any practical purposes can be considered as swirl free.

For long straight upstream pipe sections in front of the multiphase meter, the multiphase fluid may be swirl free at the inlet of the flow conditioner such that the conditioning effect does not take place. For such installations, bend(s) may be used upstream the flow conditioner to introduce swirl into the multiphase mixture as shown in FIG. 3. The inlet of the venturi 6 is now installed a relatively short distance 13 downstream a bend 12. The flow direction is indicated with an arrow 4. The direction of travel of the multiphase flow is changed in the bend generating swirl in the flow. The swirl can be further developed by using multiple bends upstream the venturi 6/flow conditioner 3.

Simplified tomographic measurements can be performed based on broad band RF (Radio Frequency) measurements of the dielectric constant/permittivity of the multiphase mixture as shown in FIG. 4. The device contains three transmitting antennas 14, 15, 16 and six receiving antennas 17, 18, 19, 20, 21 and 22 for transmission and reception of electromagnetic energy. The antennas are located in one half section of the pipe where the angles between the antennas around the circumference of the pipe wall are preferable 90 degrees as shown in FIG. 5. The antennas are coaxial conductors separated by an insulating material from the pipe wall penetrating slightly into the pipe acting as a dipole antenna inside the pipe. The device can also be used for performing velocity measurement of the multiphase fluid by cross-correlating the measurements performed in the different cross-sections of the pipe.

The device shown in FIG. 4 can be further extended by adding a photon source and detector as shown in FIG. 6. The simplified tomographic device now also contain a nuclear detector 24 for measuring photons 23 radiated from a radioactive source 22. The radioactive beam 23 is preferable radiating through the center of the pipe. Mass absorption of photons relates to the density of the multiphase fluid and can be used in combination with dielectric measurements of the multiphase mixture to obtain a more accurate measurement of the component fractions of the multiphase mixture or to extend the component range of the multiphase mixture.

Multiple photon absorption measurements can also be used for performing simplified tomographic measurements as shown in FIG. 7. A radioactive source 22 radiates photons through cross section of the pipe 1. A beam of photons 27 radiates preferable through the center of the pipe to a detector 25. A second beam 28 radiates through one half cross section of the pipe 1 to a second detector 26.

Impedance measurements of the multiphase mixture can also be used for performing simplified tomographic measurements as shown in FIG. 8. Impedance means one or several of the following characteristics of the flow: capacitance, conductance, resistance, admittance or inductance. A minimum of three electrodes, 29, 30 31, are located at one half section of the pipe 1. The angle between the electrodes should preferable be 90 degrees. Additional electrodes (32 and 33) may also be used to further improve the measurement resolution. The electrodes may be in contact with the multiphase fluid or protected from the fluid by a dielectric material. The device in FIG. 8 may also be further extended to improve the measurement accuracy and component range by adding a photon source and detector along the centerline of the pipe as shown in FIG. 6, but for simplicity this is not shown in a separate figure.

A dielectric probe located along the pipe wall as shown in FIG. 9 can also be used to perform simplified tomographic measurements. This device is particularly suited for performing dielectric measurement of a liquid film along the wall at wetgas flow conditions. The device contains a transmitting antenna 34 and two receiving antennas 35, 36 separate different distances 38, 39 from the transmitting antenna 34. The antennas are coaxial conductors isolated by an insulating material from the pipe wall, and penetrating slightly into the pipe acting as a dipole antenna inside the pipe. The antennas may be made as one compact probe unit 41 as shown in FIG. 11 where the transmitting antenna 34 and the two receiving antennas 35, 36 are electrical insulated from the metal housing 41 by ceramic glass 40. The device in FIG. 9 may also be further extended to improve the measurement accuracy and component range by adding a photon source and detector along the centerline of the pipe as shown in FIG. 6, but for simplicity this is not shown in a separate figure.

FIG. 10 shows an extension of the device in FIG. 9 where a second probe unit 38 is located a known distance 39 from a first probe unit 39. By performing simultaneous measurements with both probes and cross-correlating these measurements, the velocity of the multiphase fluid can be deducted. The device in FIG. 10 may also be further extended to improve the measurement accuracy and component range by adding a photon source and detector along the centerline of the pipe as shown in FIG. 6, but for simplicity this is not shown in a separate figure.

Transmission and reflection methods may also be used to perform simplified tomographic measurements as shown in FIG. 12. A combined transmitting and receiving device 42 is located at the pipe wall. The device may either be a clamp-on device transmitting the signals through the pipe wall 1, or transmitting directly into the flow through a whole in the pipe wall 1. The device is transmitting a signal, such as a pulse with a given duration and shape. A reflected signal is received from the multiphase mixture and based on an analysis of the reflected signal, the individual fractions and distribution of the multiphase mixture is determined. The signal may be based on transmission and reception of electromagnetic energy, acoustic energy or photons. The device in FIG. 12 may also be further extended to improve the measurement accuracy and component range by adding a photon source and detector along the centerline of the pipe as shown in FIG. 6, but for simplicity this is not shown in a separate figure.

Simplified tomographic measurements can also be performed based on transmission line methods as shown in FIG. 13. A coaxial conductor with an inner conductor 43, screen 45 and dielectric insulator 44 is mounted open ended flush with the pipe wall 1 as shown. This device is particularly suited for performing dielectric measurement of liquid(s) film along the wall at wet gas flow conditions. By transmitting a signal on the coaxial conductor and analyzing the reflected signal on the coaxial line due to the impedance difference between the coaxial cable and the pipe 1 containing the multiphase fluid, the fractions of the multiphase mixture can be determined. The device in FIG. 12 may also be further extended to improve the measurement accuracy and component range by adding a photon source and detector along the centerline of the pipe as shown in FIG. 6, but for simplicity this is not shown in a separate figure.

The main steps involved in determining the component fractions and flow rates based on the device shown in FIG. 2, are as follows.

1) Perform measurement of differential loss and phase shift (transit time) of a transmitted electromagnetic wave from a sending antenna and received at two receiving antennas located different distances from the sending antenna.
2) The measurement of step 1 is performed at a broad frequency range generating two one dimensional arrays of differential loss and phase measurements vs. frequency. A minimum of two frequencies should be used, however in practice 25-100 measurement frequencies can be used for optimum measurement performance.
3) The measurement of step 2 is repeated for several measurement directions. A minimum of two measurement directions should be used, however in practice 8-15 measurement directions should be used for providing optimum measurement performance.
4) Calculate the complex dielectric constant and water fraction of the multiphase mixture for all measurement frequencies based on the differential phase measurements.
5) Calculate the complex dielectric constant and water fraction for the multiphase mixture for all measurement frequencies based on the differential loss measurements.
6) Calculate the measured density based on measured photon absorption (optional for improved component fraction range and measurement uncertainty).
7) Calculate the GVF (gas fraction) at the center of the pipe and at the pipe wall and the water liquid ratio (WLR) based on the measurements performed in steps 1-5 or 1-6.
8) Select a concentration profile function for the gas/liquid distribution (GVF distribution) from the center of the pipe towards the pipe wall based on measurements 1-5 or 1-6.
9) Calculate the cross sectional homogenized GVF, density of the multiphase fluid based on the result from step 7 and the selected concentration profile function from step 8. Homogenized in this context means the corresponding value of GVF when the multiphase mixture is evenly distributed in the entire cross-section of the pipe.
10) Determine the flow rate oil, water and gas by combining the result of step 9 and the measurement from the venturi 8.
11) As an alternative to step 10, determine the flow rate of oil, water and gas based on cross correlating measurements performed in different cross section of the pipe with the transmitting and receiving antennas shown in FIG. 4.

Below are a more detailed description of the invention and reference is also made to the following text books in the further discussion of the present invention:

The fundamentals of electromagnetic waves traveling in any media and the behavior of electromagnetic filed in a pipe (waveguide) is well described in the literature such as *Fields and Waves in Communication Electronics*" by S. Ramo, J. R. Whinnery and T. V. Duzer, (Wiley).

Fundamental principles for performing electromagnetic measurements, electromagnetic mixing laws and tomographic measurement techniques based on electromagnetic measurements can be found in "*Electromagnetic mixing formulas and applications*", by Ari Sihvola, (IEE Electromagnetic Wave Series 47), and "*Microwave Electronics—measurements and material characterization*" by Chen et al, (Wiley) and "*Aqueous Dielectrics*" by J. B. Hasted (Chapman and Hall).

Tomographic measurement techniques based on impedance measurements are well described in *Tomographic Techniques for Process Design and Operation* by M. S. Beck et al, (Computational Mechanics Publications) and "*Imaging Industrial Flows: Applications of Electrical Process Tomography*", Plaskowski et. al, (Bristol)

Multiphase flow measurement with photon gauge, such as a gamma densitometer, is well described in "*Radioisotope Gauges for Industrial Process Measurements*", Jackson et. Al, (Wiley).

Methods for measuring velocity of a multiphase fluid is well described in "*Cross Correlation Flowmeters—their design and applications*", M. S. Beck (Adam Hilger).

Physical properties for fluids such as oil, water and gas, can be found in: "*Handbook of Chemistry and Physics*" (CRC Press), "*Complex permittivity of crude oils and solutions of heavy oil fractions*", by Friisø et al, in Journal of Dispersion Sci. Technology, 19(1), (1998) page 93-126, "*A formulation for the Static Permittivity of Water and Steam at temperatures from 238 K to 873 K at Pressures up to 1200 Moa, Including Derivates and Debye-Hünckel Coefficients*" by D. P. Fernandez et al J. Phys. Chem. Ref. Data, Vol. 26, No 4, 1997 "*Release on the IAPWS Industrial Formulation 1997 for the Thermodynamic Properties of Water and Steam*", The International Association for the Properties of Water and Steam, Erlangen, Germany.

The method is based on the following fundamental principles:

1) A multiphase mixture containing water is a polar substance. Consequently, the dielectric constant of the multiphase fluid is frequency dependent (complex) and the dependence vs. frequency is well known. Hence, each measurement frequency provides a new and independent measurement of the complex dielectric constant of the multiphase mixture.

2) Discontinuities in a multiphase fluid cause's scatter of the transmitted wave which has the effect of attenuating the wave in the direction of travel. Scatter has a large effect on the loss and is dependent on the measurement frequency and on the size and number of scattering objects such as gas bubbles. Hence, each new measurement frequency provides a new and independent measurement of the size and number of the scattering objects in the direction of travel for the electromagnetic wave. The transit time (phase measurement) is far less affected by scatter in a multiphase stream compared to the loss measurement (ref *Microwave Determination of Moisture in Coal: Comparison of Attenuation and Phase, Journal of Microwave Power*, 16, 3&4—1981). Hence by performing both loss and phase measurements at the same measurement frequency, two independent measurements of the scatter is performed in the same direction of travel for the electromagnetic wave.

3) By performing the measurements described in pt 1 and 2 above in many directions within the pipe, parameters describing the location and concentration of the gas bubbles can be derived such as GVF at the pipe wall, GVF at the center of the wall and determination of an appropriate concentration profile function describing the transition of the GVF from the center of the pipe towards the pipe wall.

The general equation for the electric field of a positively traveling electromagnetic wave in free-space with x and y components of the electric field traveling in the direction z can be described by the following equation:

$$E = (\hat{x}E_1 + \hat{y}E_2 e^{j\psi})e^{-jkz} \qquad \text{Equation 1}$$

where:
E=Electric field vector
$E_1$=Electric field in x direction
$E_2$=Electric field in y direction
$\psi$=Phase angle between x and y component
k=Phase constant or wave number For an electromagnetic wave traveling in a lossy medium such as a mixture of oil and/or gas dispersed in water, the wave number k becomes a complex number as shown in equation 2 below.

$$k = \alpha + j\beta \qquad \text{Equation 2}$$

where:
$\alpha$=Wave attenuation coefficient
$\beta$=Wave phase constant

The exponential propagation factor for phasor waves, $e^{-jkz}$, of equation 1 then becomes, $$e^{-jkz} = e^{-\alpha z} e^{-j\beta z} \qquad \text{Equation 3}$$

Where $\alpha$ and $\beta$ can be calculated according to equation 4 and 5 below:

$$\alpha = \omega \sqrt{\left(\frac{\mu\varepsilon'}{2}\right)\left[\sqrt{1 + \left(\frac{\varepsilon''}{\varepsilon'}\right)^2} - 1\right]} \qquad \text{Equation 4}$$

$$\beta = \omega \sqrt{\left(\frac{\mu\varepsilon'}{2}\right)\left[\sqrt{1 + \left(\frac{\varepsilon''}{\varepsilon'}\right)^2} + 1\right]} \qquad \text{Equation 5}$$

where:
$\varepsilon'$=Real part of the complex dielectric constant for the media
$\varepsilon''$=Imaginary part of the complex dielectric constant for the media
$\omega$=Frequency
$\mu$=Permeability of the media where complex dielectric constant $\varepsilon$ of the media can be described according to equation 6 below:

$$\varepsilon = \varepsilon' - j\varepsilon'' \qquad \text{Equation 6}$$

For air, gas, oil and condensate, the imaginary part of the dielectric constant is for all practical purposes zero. For water, the complex dielectric constant can be described by a single Debye relaxation law as shown below:

$$\varepsilon_{water} = \varepsilon_\infty + \frac{\varepsilon_s - \varepsilon_\infty}{1 + j\omega\tau} - j\frac{\sigma_{water}}{\omega\varepsilon_0} \qquad \text{Equation 7}$$

where:
$\varepsilon_{water}$=Complex dielectric constant of water
$\varepsilon_\infty$=Dielectric constant at infinite frequencies
$\varepsilon_s$=Static dielectric constant ω=Frequency
$\sigma_{water}$=Conductivity of water
$\epsilon_0$=Boltzmann's constant Equation 7 can be re-arranged for calculation of the real ($\epsilon'$) and imaginary ($\epsilon''$) part of the dielectric constant of water as shown in equation 8 and 9 below:

$$\varepsilon' = \frac{\varepsilon_s - \varepsilon_\infty}{1 + (\omega\tau)^2} \quad \text{Equation 8}$$

$$\varepsilon'' = \frac{\varepsilon_s - \varepsilon_\infty}{1 + (\omega\tau)^2}(\omega\tau) + \frac{\sigma_{water}}{\omega\varepsilon_0} \quad \text{Equation 9}$$

where:
$\epsilon_s$=Static dielectric constant
$\epsilon_\infty$=Dielectric constant at infinite frequency
$\sigma_{water}$=Conductivity of water
$\tau$=Dipole relaxation time
ω=Frequency
$\epsilon_0$=Boltzmann's constant Measurements and equations of the static dielectric constant of water, the dipole relaxation time and dielectric constant at infinite frequencies are well described in the literature. Some examples can be found in J. B. Hasted which has performed a critical review of available data in *Aqueous Dielectrics* (1973). More recent data has been published by Udo Kaatze in *J. Chem. Eng. Data*, 1989 p 371-374 and Meissner and Wentz in *Report from Boeing/AER inverstigation for CMIS* and "*A formulation for the Static Permittivity of Water and Steam at temperatures from 238 K to 873 K at Pressures up to 1200 Moa, Including Derivates and Debye-Hünckel Coefficients*" by D. P. Fernandez et al J. Phys. Chem. Ref. Data, Vol. 26, No 4, 1997.

There is also evidence that the static dielectric constant of water, the dipole relaxation time and the dielectric constant at infinite frequencies also are dependent of the salinity of the water. The static dielectric constant of water, the dipole relaxation time and the dielectric constant at infinite frequencies for fresh water can then be multiplied by a water salinity dependent correction factor in order to obtain the values of $\epsilon_s$, $\epsilon_\infty$ and $\tau$ for saline water. Some examples of the equations for the water salinity correction factor for $\epsilon_s$, $\epsilon_\infty$ and $\tau$ has been published by Meissner and Wentz in *Report from Boeing/AER inverstigation for CMIS page* 17, J. B. Hasted, "*Aqueous Dielectrics*" (Chapman Hall 1973).

The effective real part of the complex dielectric constant is:

$$\varepsilon_{\text{eff}} = \frac{\varepsilon'}{2} * \left\{ 1 + \sqrt{1 + \left(\frac{\varepsilon''}{\varepsilon'}\right)^2} \right\} \quad \text{Equation 10}$$

Where:
$\epsilon'$: Real part of dielectric constant
$\epsilon''$: Imaginary part of dielectric constant In mixture models the dielectric constant (or permittivity) of a multiphase mixture is expressed in terms of the effective real part of the dielectric constant of every constituting component and their volume fraction. Several comprehensive reviews of dielectric mixture models have been published in the literature such as van Beek, 1967; Tinga at al., 1973; Wang & Schmugge, 1980; Shutko & Reutov, 1982; Hallikainen et al., 1985; Sihlova, 1989 and "*Flow permittivity models and their applications in multiphase meters*", by E. Hammer, Proc. Multiphase Metering, IBC Technical Services, Mar.

12-13, 1997, Aberdeen. The Hanai-Bruggeman equation, originally derived by Bruggeman (1935) and later modified to yield complex dielectric constants by Hanai (1936), relates the dielectric constant of a two component mixture to the volume fractions of the components. If the two component mixture is droplets as an inner phase dispersed in a continuous media of an outer phase, the equation become:

$$\frac{\varepsilon_{inner} - \varepsilon_{mix}}{\varepsilon_{inner} - \varepsilon_{outer}} * \left(\frac{\varepsilon_{outer}}{\varepsilon_{mix}}\right)^{\frac{1}{3}} = 1 - \frac{\phi_{inner}}{\phi_{inner} + \varphi_{outer}} \quad \text{Equation 11}$$

where:
$\epsilon_{inner}$=Dielectric constant of the inner phase (dispersed phase)
$\epsilon_{outer}$=Dielectric constant of the outer phase (continuous phase)
$\epsilon_{mix}$=Measured dielectric constant of the mixture
$\Phi_{inner}$=Volume fraction of inner phase (dispersed phase)
$\Phi_{outer}$=Volume fraction of outer phase (continuous phase)

Hence, by measuring the complex dielectric constant of a multiphase mixture and knowing the complex dielectric constant of the individual components of the mixture such as water and hydrocarbon, the, volume fraction of water and hydrocarbon can be calculated.

The complex dielectric constant is determined by measuring the wave phase constant β and attenuation constant α of a plane electromagnetic wave propagating inside pipe. The measurement of β is based on a measurement of the phase difference between the two receiving antennas 17, 22 inside the pipe located at different distances from a third transmitting antenna 15 of the sensor arrangement shown in FIG. 4. The phase measurement is performed at least two frequencies in the range between 1 Mhz and 10 Ghz. The measurement can be performed with any combination of transmitters (14, 15, 16) and receiver pairs (17, 18, 19, 20, 21, 22), but for practical purposes it is recommended to limit the number of combinations to 27. A combination of 27 possible measurement directions is obtained by connecting three of the receiving antennas to a multiplexed receiver channel of an electronics device and the remaining three receiving antennas to a second multiplexed receiver channel of an electronics device. This structure prevents signal leakage between channels since the antennas are always connected to the same input channel of the receiver electronics. The attenuation coefficient α is measured in a similar manner as for β based on measurement of differential loss instead of phase.

The frequency range could also be selected based on an optimization rule for utilizing the full dynamic measurement range of the electronics. The frequencies are typical selected in the range 20-4000 Mhz, however frequencies in the range 1 Mhz to 10 Ghz may be used. The ratio between the lowest and highest frequency will be dependent of the choice of measurement frequencies and capabilities of the measurement electronics. Provided that there is sufficient loss, the propagating electromagnetic wave between the sending antenna and receiving antennas will behave according to plane wave theory.

According to plane wave theory, the phase difference between the receiving antennas can be described as:

$$\Delta\phi = \beta * Z \quad \text{Equation 12}$$

where:
$\Delta\phi$=Phase difference between receiving antennas
β=Propagating wave phase constant (ref. equation 5)

Z=d2−d1 d₁=Distance from transmitting antenna to the first receiving antenna d₂=Distance from transmitting antenna to the second receiving antenna Hence, by measuring the phase difference $\Delta\phi$ and knowing the value of Z for the system the phase constant $\beta$ for the wave propagating from the sending to the receiving antennas can be determined. Experiments has shown that the value of Z is also a function of the wavelength of the transmitted signal and there is also a slight dependence on Z on the conductivity of the multiphase fluid. This is due to the fact that the receiving antennas are located in the near field of the transmitting antenna and the model for plane wave propagation is then not completely valid. One way to model this is to use a phase and conductivity dependent calibration factor Z. This is due to the fact that the effective antenna distance Z is a function of the transmitted wavelength which again is a function of the measured phase difference between the two receiving antennas. The effective distance Z has also found to be dependent on the multiphase conductivity, which probably is related to the spread of the field in the sensor. Z can then be calculated as shown in equation 13 below:

$$Z = f(\Delta\phi, \sigma_{mix}) \quad \text{Equation 13}$$

Where:

Z: Effective antenna distance (calibration constant)

$\Delta\phi$: Measured phase difference $\sigma_{mix}$: Conductivity of the multiphase mixture The conductivity of the oil/water mixture can be calculated according to the Maxwell Garnett mixing formula as shown below:

$$\sigma_{mix}\sigma_{water} + 3*\phi_{oil}*\sigma_{water}*\frac{\sigma_{oil}-\sigma_{water}}{\sigma_{oil}-2*\sigma_{water}-\phi_{oil}*(\sigma_{oil}-\sigma_{water})} \quad \text{Equation 14}$$

Where:

$\sigma_{mix}$: Conductivity of the oil water mixture $\sigma_{oil}$: Conductivity of the oil $\sigma_{water}$: Conductivity of the water $\Phi_{oil}$: Fraction of oil in the liquid phase The complex dielectric constant can be determined in an iterative calculation loop. Assuming a constant ratio between the real and imaginary part of the dielectric constant when performing these iterations simplifies the calculations considerable. Experiments have shown that by using the same ratio between the real and imaginary dielectric constant as for pure water for a mixture of water and oil, accurate calculations of the volume fractions can be obtained. This approximation introduces only small measurement errors since the Bruggeman mixing formula is a fairly linear function.

Hence, the ratio between the real and imaginary dielectric constant is defined as:

$$K = \frac{\varepsilon''_{water}}{\varepsilon'_{water}} \quad \text{Equation 15}$$

The real part of the dielectric constant for the mixture can then be calculated by combining equation 15 and 5 as shown below:

$$\varepsilon' = \frac{2*\beta^2}{\omega^2*(\sqrt{1+K^2}+1)*\mu} \quad \text{Equation 16}$$

The steps involved in order to determine the complex dielectric constant and water fraction of the multiphase mixture based on the differential phase measurement is shown below:

1) Measure phase difference $\Delta\phi$ at a pre-determined frequency $\omega$
2) Calculate real and imaginary dielectric constant of water according to equations 8 and 9
3) Calculate K according to equation 15
4) Calculate conductivity of the oil/water mixture based on the last calculation of the oil fraction and the conductivity of water and oil using equation 14
5) Calculate effective antenna distance Z using equation 13
6) Calculate measured value of $\beta$ using equation 12
7) Calculate the real part of the dielectric constant for the oil/water mixture using equation 16
8) Calculate the imaginary part and effective real part of the dielectric constant of the oil/water mixture using equation 15 (imaginary part) and 10 (effective real part)
9) Calculate the volume fraction of water based on the effective real part of the dielectric constant of water oil and the oil/water mixture using equation 11.
10) Repeat steps 4-9 until the calculation of the water fraction has converged
11) Repeat steps 2-10 for next measurement frequency
12) Repeat steps 1-11 for next measurement direction The measured loss is treated in much the same way as the phase measurement by replacing step 6 with a calculation of $\alpha$ instead of $\beta$.

The attenuation coefficient $\alpha$ of the multiphase mixture at any measurement frequency can be calculated based on the following equation:

$$\alpha = \frac{\Delta P - P_{offset}}{20*Z}*\ln(10) \quad \text{Equation 17}$$

where:

$\alpha$: Attenuation coefficient of the multiphase mixture at a given frequency dP: Measured differential loss [dB]

$P_{offset}$: Power offset calculated in equation 15 [dB]

Z: Effective antenna distance calculated according to equation 13

The term $P_{offset}$ is needed to correct the measurement for the effect of the antenna area exposed in a particular direction of the pipe. The area of the antenna determines the coupling efficiency of the antennas, and hence the received differential loss is also affected by different antenna area exposed in the various direction of travel. However this can easily be modeled as a phase (wavelength) and multiphase conductivity dependent offset value in dB terms (decibel) as shown in equation 18 below:

$$P_{offset} = f(\Delta\phi, \sigma_{mix}) \quad \text{Equation 18}$$

Where:
 $\Delta_\varphi$: Measured phase difference
 $\sigma_{mix}$: Conductivity of the multiphase mixture The steps involved in order to determine the complex dielectric constant and water fraction of the multiphase mixture based on the differential loss measurement is similar to the steps involved for the phase measurement by replacing step 6 by a calculation of $P_{offset}$ and $\alpha$ instead of $\beta$.

It is well known that loss due to scatter is highly frequency dependent. Scattering means that a disturbance such as a gas or liquid bubble re-radiates parts of the electromagnetic energy such that the energy is lost in the direction of travel towards the receiver. Scattering is normally divided into Rayleigh scattering and Mie scattering which are further described in "*Electromagnetic Mixing Formulas and Applications*" by Ari Sihvola—IEE Electromagnetic Waves series 47.

The Rayleigh scattering of a dielectric sphere such as a liquid droplet is given, according to Sihvola, by the following equation:

$$\sigma_s = \frac{3}{8}\pi a^2 (2\pi f \sqrt{\mu_0 \varepsilon_0})^4 \left| \frac{\varepsilon_{inner} - \varepsilon_{outer}}{\varepsilon_{inner} + 2\varepsilon_{outer}} \right| \qquad \text{Equation 19}$$

Where
 $\sigma_s$: Scattering cross section
 a: diameter of the scattering object
 f: frequency
 $\mu_0$: Permeability of free space
 $\varepsilon_0$: Dielectric constant of free space
 $\varepsilon_{inner}$: Dielectric constant of the scatter object
 $\varepsilon_{outer}$: Dielectric constant of the continuous phase As seen from equation 19, the effective scattering section of an object greatly increases with frequency.

Based on the measured differential loss and phase at all measurement frequencies, a model for determining the GVF at the wall and at the center of the pipe can be derived and a selection rule for the appropriate liquid/gas concentration profile function. The most convenient way to derive the model is through empirical experiments in a multiphase flow laboratory where the flow rates of oil, water and gas can be individual controlled in addition to the distribution of the liquid and gas in the cross section of the pipe. The MPM MultiPhase Flow Laboratory particularly designed for this purpose. Based on recorded measurements of phase and loss at all measurement directions and frequencies and known values for the GVF in the center of the pipe, GVF at the pipe wall, the liquid/gas concentration profile function and water liquid ratio, the model can be derived empirically.

The GVF in the center of the pipe can also be determined based on measured photon absorption using a gamma densitometer as shown in FIG. 6. Adding a gamma densitometer improves measurement accuracy and component fraction range for the device.

Measurement of gamma ray absorption is a widely used technique for density measurement. This technique takes into account that absorption of photon beam radiation in any material in the pipe (flow meter) can be expressed by the formula:

$$N = N_0 e^{-\mu \rho d} \qquad \text{Equation 20}$$

where:
 $N_0$=Empty pipe count rate (radiation)
 N=Measured count rate (radiation)
 $\mu$=Radiation mass absorption coefficient of the material inside the pipe.
 d=Transmission length of the radiation through the cross-section of the pipe
 $\rho$=Density of the material inside the pipe Details for how to calibrate and determine GVF and density of a multiphase mixture based on nuclear detectors are described in more detail in "*Radioisotope Gauges for Industrial Process Measurements*", Jackson et. Al, (Wiley).

The homogen GVF and density can then simply be calculated based on integration methods based on the measured GVF at the wall and at the center of the pipe and the selected concentration profile function describing which together with the value of the GVF at the center and at the wall determines the value of the GVF at any point along the radius of the pipe.

Knowing the liquid and gas velocities, the oil, water and gas flow rates can be calculated based on the homogen GVF and water liquid ratio (WLR).

The dielectric constant of the mixture may also be determined based on reflection techniques and techniques based on measurement of the cut-off frequency of the pipe. In the first case, the venturi can be used as a reflecting device for an incoming electromagnetic wave. By determining the frequency for when the reflecting wave is out of phase with the transmitting wave at receivers located in the longitudinal direction of the pipe, the dielectric constant of the material within the pipe can be determined. The reflection frequency can be determined based on both phase and loss measurements.

The measured dielectric constant based on the measured reflection frequency follows the well known formula:

$$\varepsilon = \frac{k_2^2}{f_c^2} \qquad \text{Equation 21}$$

Where $\varepsilon$: Measured dielectric constant
 $k_2$: Measured frequency in air
 $f_c$: Measured frequency of multiphase mixture The cut-off frequency and reflection frequency will be fairly wide apart, such that a broad band measurements can be obtained. The measurements can also be performed in multiple directions as described for the measurements of $\alpha$ and $\beta$ and combined with the $\alpha$ and $\beta$ measurement in order to determine the GVF at the center, GVF at the wall and the GVF concentration profile function.

Other methods for performing tomographic measurements based on electromagnetic signals are described in "*Electromagnetic Techniques of Nondestructive Testing of Dielectric Materials: Diffraction Tomography*", by Bramanti et. al., Journal of Microwave Power and Electromagnetic Energy, vol. 27, No. 4, 1992 and "*Cylindrical Geometry: A Further Step in Active Microwave Tomography*", IEEE Transactions on Microwave Theory and Theory and Techniques, Vol. 39, No. 5, May 1991.

One way to obtain the liquid and gas velocity is by using cross correlation techniques. Cross correlation techniques are frequently used for measurement of multiphase flow and are well described in *Cross Correlation Flow Meters, their design and applications* by M S Beck and A Plaskowski (Adam Hilger, Bristol)—1987.

By transmitting a carrier transmitted into the flow on a transmitting antenna 14 and measuring the response, the received signal on antenna 17 and 18 contain information of the variations in the flow caused by amplitude (loss), phase or frequency modulation by the disturbances. By performing the measurements at two sections of the pipe, such as 14 17 18 and 16 21 22 located at a known distance 49, one can create two time varying signals that are shifted in time equal to the time it takes the multiphase flow to travel between the two sections. Additional measurements can be obtained by using the antennas 15 19 20.

By cross correlating the two signals using the formula:

$$R_{xy}(\tau) = \lim_{T\to\infty} \frac{1}{T}\int_0^T x(t-\tau)*y(t)dt \qquad \text{Equation 22}$$

where x(t) and y(t) are the sampled signals, the time delay τ can be calculated. The time delay τ between the signals x(t) and y(t) is a measure of the time it takes a disturbance in the flow to go from the first to the second pair of antennas.

It is common for cross-correlation based flow meters based on electromagnetic signals (i.e. capacitive, inductive and RF based flow-meters) to use a carrier or measurement signal with a frequency substantially below the cut-off frequency in order to obtain isolation between the measurement sections.

The cut-off frequency of the lowest mode in a circular wave guide ($TE_{11}$) is according to Ramo et al given by equation 23 below;

$$f_c = \frac{0.293}{a\sqrt{\mu\varepsilon}} \qquad \text{Equation 23}$$

Where
  μ: Permeability within the sensor (pipe)
  ε: Dielectric constant within the sensor (pipe)
  a: Pipe diameter The cut-off wavelength is given by:

$$\lambda_c = 3.41a \qquad \text{Equation 24}$$

Where a: Pipe diameter

According to Ramo et al, there is attenuation without phase shift for frequencies below the cut-off frequency of a wave guide and phase shift without attenuation for frequencies above the cutoff frequency, and neither attenuation nor phase shift exactly at cutoff. It is also well known that this fundamental behavior of a wave guide can be used to measure the cut-off frequency of the pipe by measuring the location of the phase shift. Based on the measured frequency, the dielectric constant of the multiphase mixture within the pipe can be derived according to equation 22.

The attenuation coefficient for an electromagnetic wave traveling in the longitudinal direction of the pipe can according to Ramo et. al be calculated according to equation 25 below:

$$\alpha = \frac{2\pi}{\lambda_c}\sqrt{1-\frac{f}{f_c}} \qquad \text{Equation 25}$$

Where
  α: Attenuation coefficient
  $\lambda_C$: Cut-off wavelength
  $f_C$: Cut-off frequency
  f: Measurement frequency Hence, by using a measurement frequency that is substantially below the cut-off frequency, the ratio $f/f_c$ is much less than 1 such that the attenuation in the longitudinal direction of the pipe becomes substantially independent of frequency. By combining equation 24 and 25 the attenuation coefficient then approximates the constant value:

$$\alpha = \frac{2\pi}{3.41a} \qquad \text{Equation 26}$$

where a: pipe diameter

Hence, by measuring or calculating the cut-off frequency of the pipe and selecting a measurement frequency that is substantially below the cut-off frequency, energy traveling in the longitudinal direction of the pipe is minimized providing electromagnetic isolation between the upstream and downstream measurement cross sections of the pipe.

Signal processing methods for determination of liquid and gas velocities based on cross correlation measurements is well known as described in "*Simulation of two peaks correlation method for gas-liquid flow velocity measurements*", PhD at UMIST, 1985 bt Corral Davalos, and "*Development of signal interpretation models for multiphase flow rate metering of oil-water-gas flow*", PhD at University of Bergen 1996 by Øivind Midttveit, "*A pulsed ultrasound cross correlation system for velocity measurement in two component fluids*", PhD at UMIST 1986 by Xu L-A and "*Analysis of Space and Time Structures in Two Phase Flow using Capacitance Sensors*", PhD University of Stavanger 1993 by Rune Viggo Time.

A venturi flow meter is commonly used for measurement of flow rate of a multiphase fluid. Any restriction in the pipe will result in a change in the velocity of the multiphase mixture and introduce a pressure drop across the restriction. Based on the theory of fluid dynamics, the square root of the pressure drop is proportional to the total mass flow rate in the pipe. A venturi tube is a structure where the pipe diameter is gradually reduced into a section of the pipe with a smaller diameter. The smaller section may be short or a relative long section. Then the diameter is gradually expanded to the original size of the pipe. Mass flow measurements with such a structure are described in the ISO standards 5167 "*Measurement of fluid flow by means of pressure differential devices inserted in circular cross-section conduits running full*" part 1—general principles and part 4—venturi tubes.

According to ISO 5167-1, the mass flow rate can be calculated as:

$$Qm = \frac{C}{\sqrt{1-\beta^4}}\frac{\pi}{4}d^2\sqrt{2\rho\Delta p} \qquad \text{Equation 27}$$

where:
  Qm=Total mass flow rate
  C=Discharge coefficient
  β=Diameter ratio between venturi throat and pipe
  d=Diameter of venturi throat
  Δp=Measured pressure drop between inlet and venturi throat
  ρ=Density of the multiphase mixture The adoption of venturi tubes for multiphase and wetgas flow conditions are further described in "*Design of a flow metering process for two-phase dispersed flows*", Int. J. Multiphase Flow vol 22, No 4, pp 713-732, "*A study of the performance of Venturi meters in multiphase flow*", by Hall, Reader-Harris, and Millington, 2*nd* North American Conference on Multiphase Technology and "*Liquid Correction of*

*Venturi Meter Readings in Wet Gas Flow*", by Rick de Leeuw, North Sea Flow Measurement Workshop—1997.

The device shown in FIG. 9 can also be used to perform simplified tomographic measurements of the flow. The device is particularly suited when the concentration distribution function approximates a step function such that most of the liquid is distributed along the wall. This is a common occurrence at wetgas flow conditions. The complex dielectric constant is determined in much the same way as described above by performing a measurement of the attenuation coefficient $\alpha$ and phase coefficient $\beta$ at a broad frequency range by transmitting on antenna 34 and receiving on antenna 35 and 36. However, in this case the concentration distribution function is assumed to be a step function and the GVF at the wall is zero, such that the measurement simplifies to become a measurement of the thickness and composition of the liquid film.

Two of the devices shown in FIG. 9 can also be combined as shown in FIG. 10 separated by a known distance 39. By using cross-correlation techniques as described above, the liquid and gas velocities can be derived.

By using two gamma detectors from a single radioactive source as shown in FIG. 7, the fractions and liquid distribution of a two phase flow can be determined. Further details of how to perform the calculations can be found in "*Radioisotope Gauges for Industrial Process Measurements*" by Jackson et. al. and "*Cross-Section Averaged Density and Mass Flux Measurements in Two-Phase Flow Through Pipes*" by Heidrick et. al., ASME Measurements in Polyphase Flows, 1-9 (1978).

Sensors for performing tomographic measurements based on impedance measurements have been known for several decades. Impedance sensors can either be based on measurement of capacitance (ECT), resistance (ERT) or inductance electromagnetic (EMT). The working principle and design of tomographic impedance sensor as shown in FIG. 8, is well described in *Tomographic Techniques for Process Design and Operation* by M. S. Beck et al, —Computational Mechanics Publications (1993), "*A Novel Approach to Reconstruction of Process Tomography Data*", by Ø. Isaksen, PhD at University of Bergen (1996) and "*Imaging Industrial Flows: Applications of Electrical Process Tomography*", Plaskowski et. al, Bristol (1995)

Transmission and reflection methods are well known method for material characterization as shown in FIGS. 12 and 13. These devices are particularly suited when the concentration distribution function approximates a step function such that most of the liquid is distributed along the wall. This is a common occurrence at wetgas flow conditions. For acoustic signals, the time it takes an acoustic pulse to travel forth and back from the reflection surface represented by the liquid/gas interface, can be used to measure liquid film thickness. Knowing the distance to the pipe wall from the acoustic transmitter and receiver, the thickness of the film can be determined.

Electromagnetic methods can be based on a radiating slot through the wall as shown in FIG. 12 or by using an open ended coaxial conductor as shown in FIG. 13. A pulse or continuous frequency is transmitted on the coaxial cable 43. Based on a measurement of the amplitude and phase variations reflected back on the coaxial conductor, the complex dielectric constant of the material within the pipe can be determined such that the thickness and fractions of the liquid film can be derived. The design and working principles of transmission and reflection sensors as shown in FIGS. 12 and 13 is further described in "*Microwave Electronics—measurement and material characterization*" by Chen et. al., Wiley (2004), and "*Permittivity Measurements of Thin Liquid Film Layers using open-ended Coaxial Probes*", Meas. Sci. Technol., 7 (1996), 1164-1173.

The invention claimed is:

1. A method for determining the flow rates of a fluid comprising a multi-component mixture of a gas and at least one liquid in a pipe, the method comprising the following steps:
   a. the multi-component mixture flow is conditioned to create a symmetrical annular gas concentration flow condition,
   b. the density distribution and/or dielectric constant distribution in said symmetrical flow within a cross-section of the pipe is determined,
   c. a function describing the radial distribution of density and/or radial distribution of dielectric constant is determined,
   d. the velocity of the multi-component mixture is determined,
   e. the temperature and pressure are obtained, and,
   f. based on the knowledge of densities and/or dielectric constants of the components of the fluid mixture, and the result from the above steps a-e, the volume and/or mass flow rates of the gas and liquid components of the fluid mixture are calculated.

2. A method according to claim 1, wherein a venturi is used to create the symmetrical annular gas concentration flow condition.

3. A method according to claim 1, wherein the venturi is used to determine the velocity of the multi-component mixture.

4. A method according to claim 1, wherein, the density distribution and/or dielectric constant distribution is determined within one half cross-section of the pipe.

5. A method according to claim 1, wherein the distribution of dielectric constant within the cross section of the pipe is measured based on measurement of energy loss and/or phase shift of an electromagnetic wave traveling through the media inside the pipe.

6. A method according to claim 1, wherein the distribution of dielectric constant within the cross section of the pipe is measured based on measurement of energy loss and/or phase shift of an electromagnetic wave being reflected from the media within the pipe.

7. A method according to claim 1, wherein the distribution of dielectric constant within the cross section of the pipe is measured based on impedance measurements.

8. A method according to claim 5, wherein the electromagnetic wave is sinusoidal.

9. A method according to claim 5, wherein the electromagnetic wave is pulse formed.

10. A method according to claim 1, wherein the distribution of density within the cross section of the pipe is measured based on measurement of absorption of photons.

11. A method according to claim 1, wherein the density distribution within the cross section of the pipe is measured based on reflection of acoustic energy.

12. A method according to claim 1, where in the function describing the radial distribution of density and/or radial distribution of dielectric constant is determined based on measurement of energy loss and/or phase shift of an electromagnetic wave traveling through the media inside the pipe.

13. A method according to claim 1, wherein the function describing the radial distribution of density and/or radial distribution of dielectric constant is linear.

14. A method according to claim 1, wherein the function describing the radial distribution of density and/or radial distribution of dielectric constant is S-shaped.

15. A method according to claim 1, wherein the function describing the radial distribution of density and/or radial distribution of dielectric constant is a step function.

16. A method according to claim 1, wherein cross-correlation techniques are used in determining the velocity of the multi-component mixture.

17. A method according to claim 1, wherein a measurement of pressure drop across a narrow passage in the pipe is used in determining the velocity of the multi-component mixture.

18. An apparatus for determining the flow rates of a fluid comprising a multi-component mixture of a gas and at least one liquid in a pipe, the method comprising a tubular section and the following elements:
  a. means for conditioning the multi-component mixture to create a symmetrical annular gas concentration flow condition,
  b. means for determining the density distribution and/or dielectric constant distribution within a cross-section of the tubular section downstream of said means for conditioning the multi-component mixture,
  c. a mathematical function describing the radial distribution of density and/or radial distribution of dielectric constant,
  d. means for determining the velocity of the multi-component mixture,
  e. means for determining the temperature and pressure, and,
  f. means for calculating the volume and/or mass flow rates of the gas and liquid components of the fluid mixture based on the information from the elements a-e and knowledge of densities and/or dielectric constants of the components of the fluid mixture.

19. An apparatus according to claim 18, comprising a venturi to create the symmetrical annular gas concentration flow condition.

20. An apparatus according to claim 18, wherein the venturi is used to determine the velocity of the multi-component mixture.

21. An apparatus according to claim 18, wherein the means for determining the density distribution and/or dielectric constant distribution is located within one half cross-section of the tubular section.

22. An apparatus according to claim 18, comprising means for transmitting electromagnetic energy at least two frequencies on at least two transmitting antennas and recording received electromagnetic energy for the frequencies at least four receiving antennas.

23. An apparatus according any to claim 18, comprising means for transmitting electromagnetic energy into the tubular section and recording reflected electromagnetic energy from the tubular section.

24. An apparatus according to claim 18, comprising means for determining the impedance distribution within the cross section of the tubular section.

25. An apparatus according to claim 18, comprising means for determining the density distribution within the cross section of the tubular section.

26. An apparatus according to claim 18, comprising means for transmitting acoustic energy into the tubular section and measuring reflected acoustic energy from the tubular section.

27. An apparatus according to claim 18, comprising a mathematical program for calculating the radial distribution of density and/or radial distribution of dielectric constant inside the tubular section.

28. An apparatus according to claim 18, comprising means for measuring the velocity of the multi-component mixture.

29. An apparatus according to claim 28, comprising means for measuring said velocity by cross-correlating measurements performed in two cross-sections of the tubular sections.

30. An apparatus according to claim 28, comprising means for measuring said velocity in a narrow passage of the tubular section.

* * * * *